United States Patent [19]

Shrinkle et al.

[11] Patent Number: 4,746,997

[45] Date of Patent: May 24, 1988

[54] METHOD AND APPARATUS FOR GENERATING/DETECTING AND ADDRESS MARK

[75] Inventors: Louis J. Shrinkle; Nicolas C. Assouad, both of Boulder, Colo.

[73] Assignee: MiniScribe Corporation, Longmont, Colo.

[21] Appl. No.: 828,211

[22] Filed: Feb. 10, 1986

[51] Int. Cl.$^4$ .............................................. G11B 5/09
[52] U.S. Cl. ......................................... 360/49; 360/48
[58] Field of Search .................... 360/49, 48, 72.2, 46, 360/51; 369/59

[56] References Cited

U.S. PATENT DOCUMENTS

| | | | |
|---|---|---|---|
| 3,089,125 | 5/1963 | Reynolds | 360/48 |
| 3,375,507 | 3/1968 | Gleim | 360/48 |
| 3,631,421 | 12/1971 | Perkins | 360/48 |
| 3,739,086 | 6/1973 | Heather | 178/6.6 |
| 3,879,752 | 4/1975 | Heidecker | 360/51 |
| 3,986,208 | 10/1976 | Sykes | 360/49 |
| 4,120,006 | 10/1978 | Nagami | 360/72 |
| 4,237,498 | 12/1980 | van Eijck | 360/72.2 |
| 4,345,280 | 8/1982 | Blagaila et al. | 360/49 |
| 4,366,511 | 12/1982 | Ranalli | 360/39 |
| 4,367,497 | 1/1983 | Jenkins | 360/48 |
| 4,413,292 | 11/1983 | Sugiyama | 360/72.2 |
| 4,495,533 | 1/1985 | Chambers | 360/72.2 |

Primary Examiner—Vincent P. Canney
Attorney, Agent, or Firm—Curtis, Morris & Safford

[57] ABSTRACT

An address mark whose pattern is distinguishable from information data is produced by generating a number of relatively long pulses followed by a number of relatively shorter pulses. Preferably, a binary "1" is recirculated through a first predetermined number of stages of a shift register (for a first pre-established number of times) and then through a second (different) predetermined number of stages (for a second pre-established number of times). A signal level transition which defines the beginning or end of a pulse in the address mark pattern is generated in response to each binary "1" output from that shift register. The address mark pattern is detected by, preferably, supplying an input signal to be detected to the same aforementioned shift register, detecting n successive longer pulses and then detecting m successive shorter pulses, where n and m are less than the aforementioned first and second pre-established numbers, respectively. Pulse detection is obtained by sensing binary "0"s in each of successive stages of the shift register.

60 Claims, 2 Drawing Sheets

METHOD AND APPARATUS FOR GENERATING/DETECTING AND ADDRESS MARK

BACKGROUND OF THE INVENTION

This invention relates to a method and apparatus for generating and detecting address marks and, more particularly, to a technique by which address marks may be generated and detected by using circuitry that is common to the generating and detecting arrangements, the address mark being adapted for transmission to a remote location or for recording on a magnetic medium, and serving as a reference from which useful information may be detected.

In the field of data communication in general, and magnetic recording in particular, "marks" are helpful in establishing a reference point from which informational data may be detected. While the present invention is readily applicable to data transmission/reception systems of many types, for the purpose of simplification, and to better understand this invention, it is described in the environment of digital magnetic recording.

In digital recording, such as on a magnetic disk, a "mark", commonly referred to as an "address mark", is recorded to indicate the start of a sector in which digital data is recorded. As is conventional, data is recorded in concentric tracks, or "cylinders", on a magnetic disk and each track has one or more sectors recorded therein, although it should be appreciated that a single sector may be comprised of more than one track. Typically, before any information is recorded on the disk, sectors are established so that, when recording is needed, information may be recorded in those sectors. It will be appreciated by those of ordinary skill in the art that such initial formatting of a magnetic disk (or other magnetic recording medium) facilitates the orderly recording and reproduction of useful information.

A typical sector includes an address mark to designate the beginning of that sector, synchronizing information to provide some synchronism between the internal clock of the data recording/reproducing apparatus and the speed at which the recording medium moves (e.g. rotates), an identifying number to identify each respective sector, and data which, typically, is recorded in blocks of 512 bytes. Usually, means are provided to identify the particular sectors in which data are recorded, thereby enabling the correct sector to be accessed quickly when that data is to be reproduced.

Of course, the aforementioned address mark should have certain attributes and characteristics that distinguish it from all other data, particularly synchronizing information and informational data, as recorded on the magnetic medium. Various techniques have been proposed heretofore for generating and/or detecting different types of address marks. For example, U.S. Pat. No. 4,345,280 suggests that the address mark be recorded as a high frequency field followed by a low frequency field, this pattern normally not being present in informational data. However, the detection technique described in this patent is relatively complicated to implement in that it calls for a Mealy sequential machine to determine that high frequency pulses of a correct length are followed by low frequency pulses of a correct length. Although the very same read/write heads typically are used to record and reproduce informational data, including the recording and reproduction of the address mark, this patent contemplates the use of different devices for address mark recording and for address mark detection. Hence, not only is the technique described in this patent rather difficult to implement, it also is relatively expensive.

The utility of address marks is found not only in digital data recording on magnetic disks but also in the field of video recording on magnetic tape. In U.S. Pat. No. 3,739,086, a "frame boundary signal" formed of a sequence of alternating "1"s and "0"s interposed between beginning and ending pairs of "1"s is recorded. Presumably, the pattern formed of this particular sequence normally is not found in useful data. Here, the frame boundary signal is detected by sensing a portion of the alternating "1"/"0" sequence. However, it is believed that, in view of this particular pattern, serious constraints are placed upon the data pattern that may be recorded in addition to the frame boundary signal. Furthermore, since only a portion of the alternating bit sequence need be detected, it is possible that spurious errors that are introduced into the useful data for a brief period of time may be interpreted falsely as a frame boundary signal.

To provide high density magnetic recording of digital data, it is proposed in U.S. Pat. No. 4,367,497 to record a preamble consisting of fifteen successive "1"s, followed by useful data which, in turn, is followed by a mirror-image postamble. However, it appears that this particular preamble/postamble pattern was adopted specifically for the NRZI code but is not necessarily satisfactory when utilizing the conventional codes (such as the 2,7 code) that have been adopted in conventional digital data handling apparatus now commercially available.

Various additional techniques and patterns have been proposed for generating unique address marks. Nevertheless, various difficulties and disadvantages are associated with those techniques and patterns. In particular, there has been a need for generating unique address marks that are easily distinguishable from informational data, particularly from data that is recorded in, for example, 2,7 or MFM code which normally is used for recording digital data on magnetic disks. Moreover, it is important that such address marks be generated and detected by apparatus that is reliable but is relatively inexpensive. Preferably, circuitry that is used for address mark generation also should be used for address mark detection. These desirable features are achieved by the present invention.

OBJECTS OF THE INVENTION

Therefore, it is an object of the present invention to provide a method and apparatus for generating an address mark that is distinguishable from informational data and that may be transmitted to a remote location or recorded on a magnetic medium.

Another object of this invention is to provide a method and apparatus for accurately detecting an address mark that is received from a remote location or reproduced from a magnetic medium.

Another object of this invention is to provide relatively inexpensive apparatus that can be used for both generating and detecting a unique address mark.

An additional object of this invention is to provide apparatus, as aforementioned, in which common elements are used for both generating and detecting address marks.

Various other objects, advantages and features of the present invention will become readily apparent from the ensuing detailed description, and the novel features will be particularly pointed out in the appended claims.

SUMMARY OF THE INVENTION

In accordance with this invention, an address mark that is distinguishable from informational data is produced by generating a data level transition followed by a constant data level for a first predetermined time duration, these two steps being repeated a first pre-established number of times, and then thereafter, generating a data level transition followed by a constant data level for a second predetermined time duration, these latter steps being repeated a second pre-established number of times. As a result of the foregoing technique, the address mark pattern comprises a first number of relatively long pulses followed by a second number of relatively short pulses. In the particular embodiment described, the number of long pulses is equal to the number of short pulses.

The aforementioned address mark preferably is produced by recirculating a binary "1" through a first predetermined number of stages of a shift register a first pre-established number of times and then recirculating a binary "1" through a second predetermined number of stages of that shift register a second pre-established number of times. An output is taken from a suitable stage of that shift register, and this output may be used to trigger a bistate device resulting in the pulse pattern mentioned above.

The aforementioned address mark, which comprises x long pulses followed by y short pulses, is detected by sensing n-out-of-x long pulses and then m-out-of-y short pulses. As a feature thereof, the aforementioned detection of n and m pulses is carried out within a preset time period. If this period expires before n and m pulses are detected, an address mark is not indicated.

In the preferred embodiment, it is assumed that a pulse in the address mark is formed of successive binary "0"s. The address mark may be detected by shifting an input signal to be detected into a shift register and then sensing when a binary "0" is stored in each of successive stages of that shift register. This results in the sensing of a relatively longer pulse, and this sensing operation is carried out n times. Then, a similar operation is carried out by sensing when a binary "0" is stored in each of a smaller number of successive stages of the shift register, this latter sensing operation being carried out m times. As an alternative to the latter sensing operation, the contents of selected stages of the shift register (corresponding to m pulses) may be gated for the purpose of sensing when m shorter pulses have been shifted into the shift register. For the particular code which normally is used in data recording, and in view of the characteristics of magnetic recording and reproduction, a binary "1" is used to represent a transition that designates the beginning and ending of a pulse. The number of binary "0"s which lie between successive binary "1"s determines the length of a pulse.

BRIEF DESCRIPTION OF THE DRAWINGS

The following detailed description, given by way of example and not intended to limit the present invention solely to the embodiments described herein, will best be understood in conjunction with the accompanying drawings in which:

FIGS. 3A-3T are waveform diagrams which are useful in understanding the operation of the embodiments shown in FIGS. 1 and 2.

DETAILED DESCRIPTION OF CERTAIN PREFERRED EMBODIMENTS

The address mark that is generated and detected in accordance with the present invention is particularly applicable for recording on magnetic disks, such as those magnetic disk systems known as small Winchester (or "hard") disks. As mentioned above, the address mark designates the beginning of a sector and, when so-called "soft sector formatting" is used, the address mark is generated and recorded prior to the recording of useful information. That is, the user of the disk first sets up the appropriate sectors (during an initializing operation) in which data subsequently is recorded.

The address mark to be described is formed of three bytes and is compatible with enhanced small drive interfaces (ESDI) as well as other "smart" peripheral interfaces that are used commercially with soft sector drive formats. Those of ordinary skill in the art who are familiar with small disk drives will recognize that the address mark of the present invention is readily adapted for use with overfiltered qualifier detection schemes. Contrary to address mark detectors that have been used heretofore, the present invention detects recorded address marks accurately without requiring automatic gain control or threshold detectors. As a result, errors in detection that have been attributed to such devices are avoided. Furthermore, in the absence of automatic gain control amplification and threshold detection, reduced gap sizes in the recorded preamble areas may be turned to account with concomitant reduced "overhead" in the sector format. Advantageously, the amount of apparatus and circuitry (i. e. the "hardware") needed for address mark detection is reduced.

In the particular embodiment described below, the address mark consists of a unique pattern which is distinct from informational data and which may be used with various encoding schemes conventionally used in data processing, such as 2,7 code, MFM code and other codes which permit up to a maximum of seven successive binary "0"s in the data pattern. In such codes a binary "1" is recorded in the form of a transition signal from one binary level to another, and a binary "0" is recorded as a constant data level having no transition during a bit period. Thus, the encoding schemes with which the address mark of the present invention may be used contemplate a maximum of one signal level transition every eight bit periods (or clock cycles). That is, the maximum separation between adjacent signal level transitions is seven clock cycles.

The address mark of the present invention exhibits desirable redundancy in the pattern thereof, thereby enabling the detection of a distorted but correct address mark that is reproduced from the magnetic disk or other magnetic medium, or that is otherwise received by the address mark detector. False address mark detection, that is, the misinterpretation of informational data or noise as erroneously constituting an address mark, is substantially avoided by reason of the unique pattern which constitutes this address mark as well as other false detection prevention techniques described below.

The address mark of the present invention permits more than three successive "0"s both at the beginning of the address mark pattern and at the end thereof. Advantageously, this minimizes the possibility of a failure to detect signal level transitions and reduces the effects of "bit shift" normally attending magnetic recording and reproduction.

It will be recognized that the address mark generated in accordance with the present invention is recorded, or written on the magnetic disk (or other storage medium) prior to the recording of useful information thereon, that is, when the disk initially is formated by the user. Typically, an index pulse is generated when the disk rotates to a reference position, at which time the usual disk controller apparatus (or software), normally referred to merely as a "controller", controls the writing of a format in each track as the disk rotates. This format is predetermined and consists primarily of an intersector gap (which is a count representing the number of this particular sector), an address mark, a phase-locked loop synchronizing pattern (which is used to synchronize the "read" clock during a data read operation), an identifying code, a "write splice" which is produced during normal operation of the disk when a read mode is changed over to a write mode, as when sector information first must be read from the disk to access a desired sector in which information then is written, additional phase-locked loop synchronizing information which precedes the data field, and then 512 data bytes (which, when the disk initially is formatted consists substantially entirely of binary "0"s). Once formatted, the disk is ready for the writing of informational data thereon and thereafter for the reading of that data.

Figure 1:
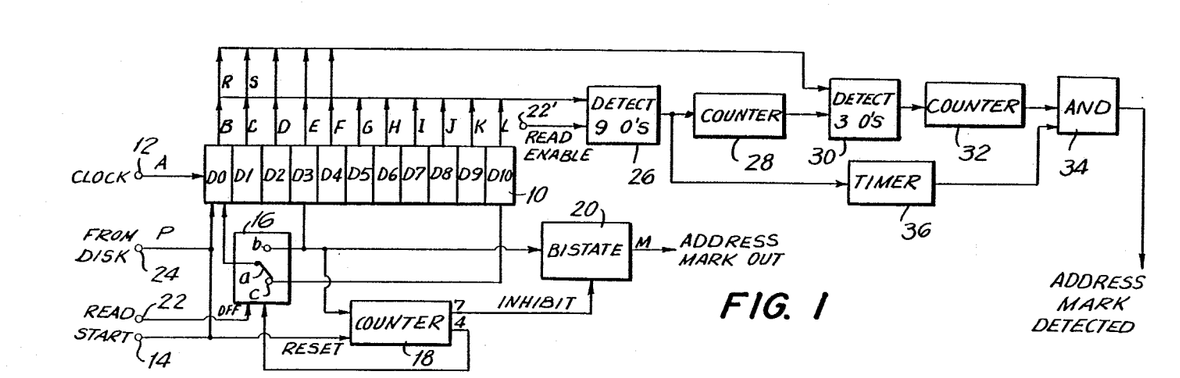
FIG. 1 is a block diagram of an address mark generator/detector in accordance with the present invention.

One embodiment of apparatus for generating and detecting address marks in accordance with the present invention is illustrated in FIG. 1. To simplify the following description, it is assumed that the address mark is recorded on a magnetic disk and, subsequently, is detected from that disk. However, it will be readily appreciated by those of ordinary skill in the art that the address mark may be recorded on and detected from any other desirable storage medium or, alternatively, the address mark may be transmitted to a remote location whereat it is detected for the purpose of referencing informational data which follows that address mark.

The address mark generator/detector of the present invention is comprised of a multi-stage shift register 10, a multiplexer, or change-over switch 16, a counter 18 and a bistate device 20, all comprising, in combination, the address mark generating portion of the illustrated apparatus. In the embodiment shown in FIG. 1, the detecting portion of this apparatus includes, in addition to shift register 10, detectors 26 and 30, counters 28 and 32, a timing circuit 36 and an AND gate 34. To facilitate a ready understanding of the present invention, the address mark generating portion first will be described and description of the detecting portion will follow.

Shift register 10 is of conventional construction and may be formed of, for example, individual "clocked" flip-flop circuits. In the illustrated embodiment, the shift register is comprised of stages D0, D1, D2, . . . D10, each stage having a data input terminal, a data output terminal, a clock input terminal and other terminals commonly utilized in such devices, such as an enable terminal, a reset, or clear terminal, and the like. It will be appreciated that the drawing is a simplification of the apparatus which may be utilized to implement the present invention, such simplification serving to prevent obfuscation of the present invention. Those of ordinary skill in the art, after reading and understanding the following description, will be readily enabled thereby to make and use the present invention and to construct an actual working embodiment thereof.

As a numerical example, shift register 10 is comprised of eleven stages D0-D10. A clock input terminal 12 is coupled to the shift register and is adapted to supply thereto clock pulses of a suitable frequency generated by a conventional clock generator. Selected stages of shift register 10 are interconnected through multiplexer (or change-over switch) 16 so as to form a recirculating register. The multiplexer is of conventional construction and is schematically illustrated as including a change-over terminal a that may be selectively connected to one or the other of fixed terminals b and c. Change-over terminal a is connected to the data input terminal of, for example, stage D0 while fixed terminals b and c are connected to the data output terminals of stages D3 and D10, respectively. It will be appreciated that other stages may be interconnected by change-over switch 16, and the particular stages which are so interconnected in FIG. 1 merely are illustrative. As will become apparent from the ensuing description, the particular stages whose data output terminals are connected in feedback relation to the data input terminal of yet another stage are selected such that a particular bit (e. g. a binary "1") is shifted either through ten successive shift register stages or through three successive stages prior to being recirculated back to an initial stage. Hence, and as illustrated, a common input stage D0 may receive a binary "1" that is recirculated thereto either when that bit has been shifted through shift register 10 into stage D10 or when that bit has been shifted to stage D3, the particular stage that is selected for recirculation being selected by change-over switch 16. Alternatively, a common output stage may be selectively connected in feedback relation to two different input stages. For example, change-over switch 16 may be constructed in a manner such that output stage D10 is connected through the change-over switch either to one input stage D0 or to another input stage, such as stage D7. The purpose of changing the number of stages through which a binary "1" is shifted prior to recirculation will become apparent from the description below.

Change-over switch 16 includes an inhibit input coupled to a terminal 22 which receives an inhibit signal during an address mark detection (or "read") operation. In response to such an inhibit signal, bits that are supplied to fixed terminals b and c of the change-over switch nevertheless are not fed back to stage D0.

The change-over switch also includes a selector input which is coupled to counter 18 and is adapted to receive a select control signal from the counter. This select control signal typically is a bistate signal and, for example, when this signal is a binary "0", change-over terminal a is connected to fixed terminal c; and when the select control signal is a binary "1", change-over terminal a is connected to fixed terminal b.

Counter 18 is connected to the data output terminal of stage D3 (or, alternatively, to the data output terminal of any other stage included in shift register 10 which is designated the output stage), and is adapted to have the count thereof incremented each time a binary "1" is shifted into, or stored in, stage D3. The counter includes a reset input coupled to a terminal 14 to receive a reset signal therefrom. Typically, the commencement of an address mark generating operation is initiated by a "start" signal supplied to terminal 14, and this "start" signal serves as a count reset signal for counter 18. As illustrated, terminal 14 also is coupled to the data input terminal of stage D0 (or any other predetermined input stage of shift register 10) for the purpose of supplying a signal such as a binary "1" to this stage.

Counter 18 is illustrated as including two outputs, one of which is coupled to the selector input of change-over switch 16 and the other is coupled to an inhibit input of bistate device 20. The counter output coupled to change-over switch 16 normally is provided with a binary "0" when the count of this counter is less than the count of 4. When counter 18 is incremented to a count of 4, this signal changes over to a binary "1". Thus, it will be appreciated that prior to reaching a count of 4, the output of stage D10 of shift register 10 is fed back via change-over switch 16 to stage D0. However, once four binary "1"s have been shifted to stage D3, the count of counter 18 is incremented to the count of 4 and change-over switch 16 is operated to feed back the output of stage D3 to stage D0.

The output of counter 18 which is coupled to bistate device 20 normally exhibits a binary "0" until the count of this counter is incremented to, for example, a count of 7. At that time, the signal provided at this output changes over to a binary "1" which functions as an inhibit signal for the bistate device. Other suitable counts may be used to inhibit the bistate device and, as a further alternative, counter 18 may be a relatively simple counting circuit which, when incremented to a first predetermined count functions to control the state of change-over switch 16 and then, when incremented to a second predetermined count (or, for example, when recycled to that same first predetermined count) serves to inhibit bistate device 20. The bistate device may comprise, for example, a simple flip-flop circuit that is adapted to change its state each time a binary "1" is supplied to its data input. It is appreciated, therefore, that in the embodiment illustrated in FIG. 1, the output of bistate device 20 undergoes a signal level transition in response to each binary "1" supplied from stage D3 (or from any other desired output stage of shift register 10). That is, the bistate device functions to generate a constant data level substantially free of any data level transitions until the binary "1" is supplied thereto, whereupon the output data level undergoes a transition from a binary "1" level to a binary "0" level, or vice versa.

Before describing the address mark detecting portion of the apparatus illustrated in FIG. 1, the manner in which the address mark generating portion operates will be explained in conjunotion with the waveform diagrams shown in FIGS. 3A-3N. When the generation of an address mark is desired, as when a magnetic disk is to be formatted or when information is to be transmitted to a remote location, a suitable "start" pulse is provided at terminal 14, as by appropriate circuitry or software. As a result of this "start" pulse, a binary "1" is supplied to the data input terminal of stage D0. Upon the occurrence of a clock pulse (shown in FIG. 3A), this binary "1" is loaded into and stored in this stage, resulting in an output B at the data output terminal of stage D0, as shown in FIG. 3B. It will be appreciated that the letters used in FIG. 1 identify the waveforms illustrated in the corresponding diagrams of FIG. 3, such as waveform A being illustrated in FIG. 3A, waveform B being illustrated in FIG. 3B, and so on.

Figure 3A:
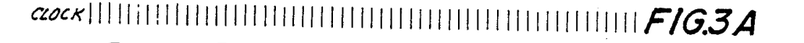
Figure 3B:
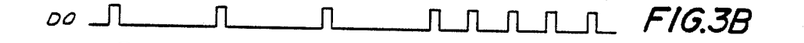
Figures 3C, 3D:
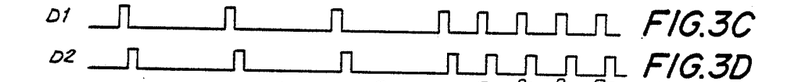

Upon successive ones of the clock pulses shown in FIG. 3A, the binary "1" that had been loaded into stage D0 is shifted, one stage at-a-time, successively through the remaining stages of shift register 10. Thus, the initial binary "1" that had been loaded into stage D0 is shifted, upon the occurrence of the next clock pulse, into stage D1, as shown in FIG. 3C, and then into stages D2, D3 and so so, as represented by FIGS. 3D-3L. It is appreciated that, as a binary "1" is shifted into a particular stage, a corresponding binary "1" is provided at the data output terminal of that stage. Since the initial "start" pulse is followed by binary "0"s, only a single binary "1" is loaded into shift register 10 and this binary "1" is shifted successively therethrough from one stage to the next. As a result, a binary "1" is provided at successive data output terminals for respective durations each equal to a clock pulse period, as illustrated in FIGS. 3B-3L.

Figures 3E, 3F:
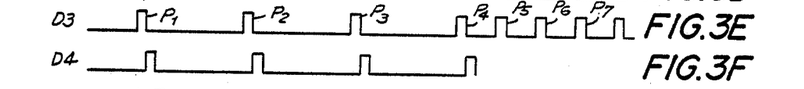
Figures 3G, 3H:
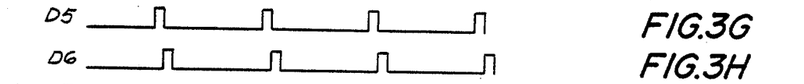
Figure 3I:
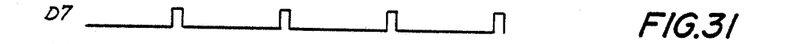

When a binary "1" is shifted to stage D3, the count of counter 18 is incremented and, moreover, this binary "1" is used to trigger bistate device 20. Assuming that the state of this bistate device initially corresponds to a binary "0", as illustrated in FIG. 3M, the occurrence of the first binary "1" shifted to stage D3 (shown as pulse $P_1$ in FIG. 3E) changes the state of the bistate device from a binary "0" to a binary "1" at time $t_1$, as illustrated. Thus, the binary "1" that had been shifted to stage D3 results in a transition in the address mark output produced by bistate device 20.

Figures 3J, 3K, 3L, 3M, 3N, 3O, 3P, 3Q:
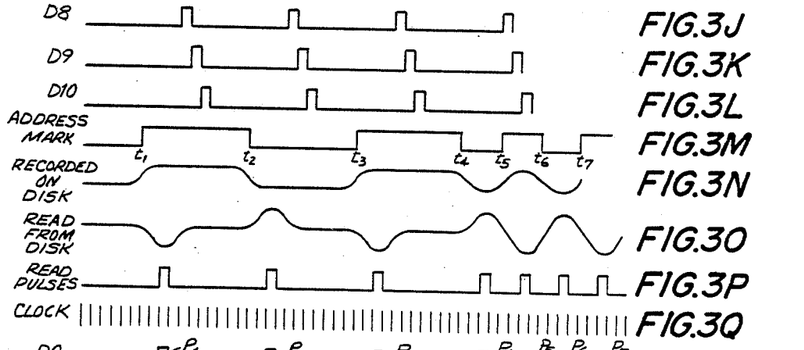

The binary "1" that is shifted sequentially through shift register 10 ultimately is shifted to stage D10, as illustrated in FIG. 3L. This binary "1" is returned to stage D0 via change-over switch 16 and, thus, this binary "1" is recirculated, as may be seen by observing the waveforms shown in FIGS. 3L and 3B. After this binary "1" is fed back to stage D0, it is shifted once again through the shift register until it is shifted to stage D3. At that time $t_2$ (pulse $P_2$), the count of counter 18 is incremented once again and, moreover, the state of bistate device 20 is changed over from its binary "1" level to its binary "0" level, as shown in FIG. 3M.

The foregoing process is repeated, whereupon the binary "1" continues to recirculate through shift register 10 and to cause a changeover in the state of bistate device 20, thus resulting in transitions at times $t_1$, $t_2$, $t_3$ and $t_4$ in the address mark produced by the bistate device. Eventually ($t_4$), the count of counter 18 is incremented to a count of 4. That is, the fourth time that a binary "1" is shifted through shift register 10 (pulse $P_4$), counter 18 supplies a binary "1" select control signal to change-over switch 16, resulting in the connection of change-over terminal a to fixed terminal b. As a result, the binary "1" that had been shifted into stage D3 and that had resulted in the incrementing of the count of counter 18 to a count of 4 now enables the binary "1" of stage D3 (pulse $P_4$) to be fed back to stage D0.

By connecting stage D3 to stage D0 in feedback relation, the binary "1" now is recirculated merely through stages D0, D1, D2 and D3 before being fed back to stage D0. As a result, the state of bistate device 20 now is changed over more rapidly at times $t_5$, $t_6$ and $t_7$, as illustrated in FIG. 3M, thereby producing output pulses of narrower duration. Counter 18 continues to be incremented each time a binary "1" is shifted to stage D3; and at time $t_7$ when the count of this counter reaches a count of 7, the counter supplies a binary "1" inhibit signal to bistate device 20. Consequently, although binary "1"s may continue to be supplied to the bistate device from stage D3, no further changes are made in the level of the address mark, as shown in FIG. 3M.

Thus, it is seen that, in response to a "start" pulse, or signal, a binary "1" is loaded into shift register 10 and is recirculated between stages D0 and D10 for three circulation periods ($t_1-t_2$, $t_2-t_3$ and $t_3-t_4$); and then this binary "1" is recirculated between stages D0 and D3 for another three circulation periods ($t_4-t_5$, $t_5-t_6$ and $t_6-t_7$). Each time the binary "1" is shifted to stage D3, a transition in the address mark is produced by bistate device 20, as shown in FIG. 3M. At time $t_7$ the count of counter 18 is incremented to a count of 7, whereupon the pattern comprising the address mark is terminated, as shown in FIG. 3M. It will, therefore, be appreciated that the address mark generated by bistate device 20 in response to pulses $P_1-P_7$ supplied from stage D3 consists of the pattern formed of three successive relatively longer pulses followed by three successive relatively shorter pulses, as illustrated in FIG. 3M. It will be seen that the relatively longer pulses exhibit a duration ($t_1-t_2$, for example) substantially equal to 11 clock pulse periods and the duration of each relatively shorter pulse ($t_4-t_5$, for example) is substantially equal to 4 clock pulse periods. Thus, the generated address mark exhibits a data level transition produced in response to a binary "1" shifted to stage D3, followed by a constant data level of a duration equal to 11 clock pulse periods, followed by another data level transition, this pattern being repeated to result in the formation of three successive pulses. Following the data level transition ending the third pulse, the address mark is provided with a constant data level of a duration equal to 4 clock pulse periods, and this is followed by yet another data level transition, this pattern being repeated three times to provide three relatively shorter, or narrower, pulses, as shown in FIG. 3M.

In the embodiment described, the address mark preferably is comprised of three longer pulses followed by three shorter pulses. Alternatively, the shorter pulses can be followed by the longer pulses. As yet a further alternative, the duration of all of the pulses included in the address mark may be equal. As another alternative, the number of longer pulses may be greater or less than the number of shorter pulses, as desired.

Although the address mark produced at the output of bistate device 20 is illustrated as a pattern of sharp rectangular pulses, it is appreciated that the actual address mark signal that is recorded on a magnetic medium exhibits gradual rise times and fall times (attack and decay times) at each data level transition, as shown more particularly in FIG. 3N. That is, rather than having the relatively sharp transitions shown in FIG. 3M, the pulses that actually are recorded on the magnetic medium may be formed of relatively rounded, or gradual, transitions effecting finite attack and decay times.

Turning now to the apparatus by which the address mark illustrated in FIG. 3N is detected, that is, to the address detecting portion of the apparatus shown in FIG. 1, it is seen that shift register 10, the same shift register that is used to generate the address mark, also is used to detect it. In the illustrated embodiment, selected ones of stages D0–D10 are connected to binary "0" detector 26, this detector serving to detect the presence of, for example, nine consecutive binary "0"s stored in the shift register. As an example, detector 26 may comprise a 9-input AND gate, or equivalent. Detector 26 also includes an enable input coupled to a terminal 22' to receive a "read enable" signal. This "read enable" signal is produced when information is read from a magnetic disk (or when information is received from a remote location) and the occurrence of an address mark is to be detected. It will be seen from FIG. 1 that, to avoid misinterpretations, confusion and ambiguities between the detection and generation of an address mark during a read operation, a terminal 22 is adapted to supply an inhibit, or "off" signal to change-over switch 16 during a data read (or address mark detection) operation. Thus, when an address mark is to be detected, detector 26 is enabled by the "read enable" signal supplied thereto and change-over switch 16 is inhibited to prevent the binary "1" that may be circulated through shift register 10 from being recirculated, or fed back, to stage D0.

The output of detector 26 is coupled to counter 28 and also to timer 36. The detector is adapted to produce a sense signal, such as a binary "1", upon the detection of nine consecutive binary "0"s stored in stages D0–D10 of shift register 10. Each time such a sense signal is produced, the count of counter 28 is incremented. Also, when the first such sense signal is produced, timer 36 is initiated to measure a time-out period. This time-out period is of predetermined duration and establishes a reference time period during which an address mark must be detected.

When the count of counter 28 is incremented from an initial count, such as a count of zero, to a count of two, the counter produces an output signal which enables the operation of detector 30. This detector is similar to detector 26 with the modification that detector 30 is adapted to detect the occurrence of binary "0"s stored in three successive, predetermined stages of shift register 10. To distinguish the three "0"s constituting the narrower pulses from three "0"s included in a longer pulse, detector 30 may comprise a 5-input AND gate connected to the data output terminals of stages D0, D1, D2, D3 and D4, respectively. Each time that detector 30 detects the presence of three consecutive binary "0"s preceded and followed by a binary "1", a sense signal is produced thereby. It is appreciated, of course, that the operation of detector 30 is inhibited until two sets, or strings, each comprised of nine binary "0"s are detected. As mentioned above, counter 28 is adapted to sense when two such sets, or strings, of these binary "0"s have been loaded into shift register 10 and thus to enable the operation of detector 30.

Counter 32 is coupled to detector 30 and is adapted to count the sense signals produced by this detector. Preferably, counter 32 is adapted to produce a binary "1" output signal when two such sense signals have been counted. Counter 32 thus may be substantially similar to counter 28. When two sets, or strings, of binary "0"s, each comprised of three "0"s, have been detected, counter 32 produces a binary "1" output signal which is coupled to AND gate 34 together with an enable output from timer 36. More particularly, when the first sense signal is produced by detector 26, thus initiating the time-out operation of timer 36, the output signal produced by this timer is changed over from a binary "0" to a binary "1", thus enabling the operation of AND gate 34. If, during the period that the output signal produced by timer 36 is a binary "1", counter 32 produces a binary "1" output signal, AND gate 34 operates to produce an output representing the detection of an address mark. However, if counter 32 fails to produce a binary "1" output signal prior to the completion of the time-out period of timer 36, the output signal produced by the timer returns to its binary "0" condition, thereby disabling AND gate 34. Consequently, an indication of the detection of an address mark is not provided if two strings of 9 "0"s and two strings of 3 "0"s are not detected within the time-out period of timer 36.

The manner in which an address mark is detected now will be briefly described in conjunction with the waveform diagrams shown in FIGS. 3O-3T. FIG. 3O represents the address mark as read from a magnetic disk. A comparison of FIGS. 3N and 3O indicates that transitions in the address mark pulse pattern (FIG. 3N) are read as negative-going and positive-going pulses, the polarity of such pulses being a function of the polarity of the transitions in the address mark pattern. Thus, each pulse shown in FIG. 3O represents a transition in the address mark pattern. Conventional means (not shown), such as rectifiers, zero cross detectors, and the like, may be used to convert the negative-going and positive-going pulses shown in FIG. 3O to the relatively sharp positive-going pulses shown in FIG. 3P. It will be appreciated that pulses $P_1$-$P_7$ shown in FIG. 3P represent the transitions at times $t_1$-$t_7$, respectively, in the address mark pattern shown in FIG. 3M. The pulses shown in FIG. 3P are represented as the "read pulses" which are read from the magnetic disk. It is these read pulses that are serially supplied to terminal 24 and loaded into stage D0 of shift register 10 during a read operation.

Figures 3R, 3S, 3T:
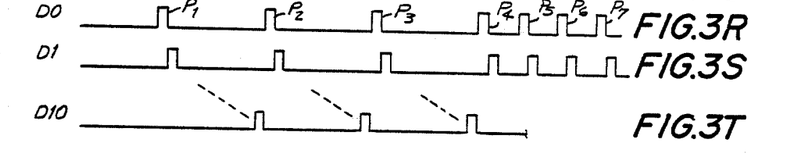

The read pulses of FIG. 3P are clocked through the successive stages of the shift register in response to the clock pulses shown in FIG. 3Q. It will be appreciated that the clock pulses shown in FIGS. 3Q and 3A may be generated by a common clock generator. As the read pulses are loaded into and shifted through shift register 10, such pulses are shifted from stage to stage, as represented by FIGS. 3R, 3S and 3T. The first pulse $P_1$ is loaded into stage D0 and then, in response to the next-following clock pulses, this binary "1" is shifted into stage D1 and then into stage D2 and so on in response to such clock pulses.

If an address mark actually has been read from a disk, then at least nine successive stages D0-D8 or D1-D9 or D2-D10 will be provided with binary "0"s concurrently. The occurrence of nine successive "0"s in informational data is a prohibited condition of the 2,7 code, the MFM code and most other conventional codes normally used to manipulate and record digital data. Thus, substantially the only time that nine successive binary "0"s will be present in shift register 10 is when an address mark has been read or otherwise received. Upon the first occurrence of these nine successive binary "0"s, detector 26 supplies a first sense signal to counter 28 to increment the count from an initial count (such as a count of zero) to a count of one. Although not shown in FIG. 1, it will be appreciated that, preferably, counter 28 (as well as counter 32) is reset to the aforementioned initial count in response to the "read enable" signal supplied to terminal 22' (or in response to the "read" signal supplied to terminal 22).

It is expected that, during the normal loading and shifting of the read pulses $P_1$-$P_4$ (FIG. 3P) into shift register 10, two or more occurrences of 9 successive binary "0"s in the shift register will be detected. Upon the detection of the second string of 9 "0"s, detector 26 supplies another sense signal to counter 28 whose count now is incremented to a count of two. This enables detector 30 to detect the occurrence of a string of 3 binary "0"s stored in shift register 10. As an example, and as represented by FIG. 1, when three successive binary "0"s are stored in stages D1, D2 and D3, respectively, preceded by a binary "1" in stage D4 and followed by a binary "1" in stage D0, detector 30 produces a sense signal. When two sense signals have been produced by detector 30, as when two strings of 3 "0"s are detected, the count of counter 32 will be incremented from an initial, or reset count (such as zero) to a count of two. At that time, a binary "1" output signal is supplied to AND gate 34 and, as mentioned above, if timer 36 has not yet timed out, an address mark detected indication is produced by this AND gate. However, if counter 32 has not reached its count of two within the time-out period, the detection of an address mark will not be indicated.

From the foregoing, it is appreciated that, although an address mark is comprised of, preferably, three relatively longer pulses followed by three relatively shorter pulses, as illustrated in FIG. 3M, the illustrated address mark detector functions merely to detect 2-out-of-3 longer pulses followed by 2-out-of-3 shorter pulses, this dual 2-out-of-3 detection being carried out within a predetermined time-out period. The time-out period, which is triggered after the first relatively longer address mark pulse is detected by detector 26, may be equal to, for example, the duration of the 3 byte address mark.

It will be appreciated that detector 30 may be connected to any desired group of stages included in shift register 10. The particular stages to which the detector is connected should be such that three binary "0"s bracketed by preceding and succeeding binary "1"s may be detected.

By reason of the unique address mark pattern of the present invention, after 2-out-of-3 longer pulses have been detected, it is expected that at least two shorter pulses soon will follow. If these shorter pulses are not detected prior to the completion of the time-out period by timer 36, the false detection of an address mark is avoided. Thus, only true address mark patterns are sensed by the arrangement illustrated in FIG. 1. It is possible that the pattern of three relatively shorter pulses included in the address mark pattern, that is, the pattern extending from read pulses $P_4$ to $P_7$, may be quite similar to the phase-locked loop synchronizing pattern normally included in a sector. As a result of this similarity of patterns, the detection of 2-out-of-3 shorter pulses may occur when, in fact, the phase-locked data pattern is read from the disk. However, since the detection of 2-out-of-3 shorter pulses cannot occur until at least 2-out-of-3 longer pulses have been detected, this presents no significant disadvantage or drawback.

To summarize, detectors 26 and 30 function to detect the occurrence of different numbers of successive binary "0"s. In accordance with the address mark pattern of the present invention, successive binary "0"s represent the rectangular pulses that constitute the address mark. Detector 26 serves to detect the presence of the longer pulses and detector 30 serves to detect the presence of the shorter pulses. Although three longer and three shorter pulses are included in the address mark pattern, only 2-out-of-3 of each set of these pulses need be detected to indicate the occurrence of an address mark. Hence, in the event of drop-out, inaccurate pulse reproduction, or other factors which would interfere with the proper reproduction or detection of an address mark pulse pattern, the accurate detection thereof nevertheless is provided. The feature of pattern redundancy assures accurate detection.

Figure 2:
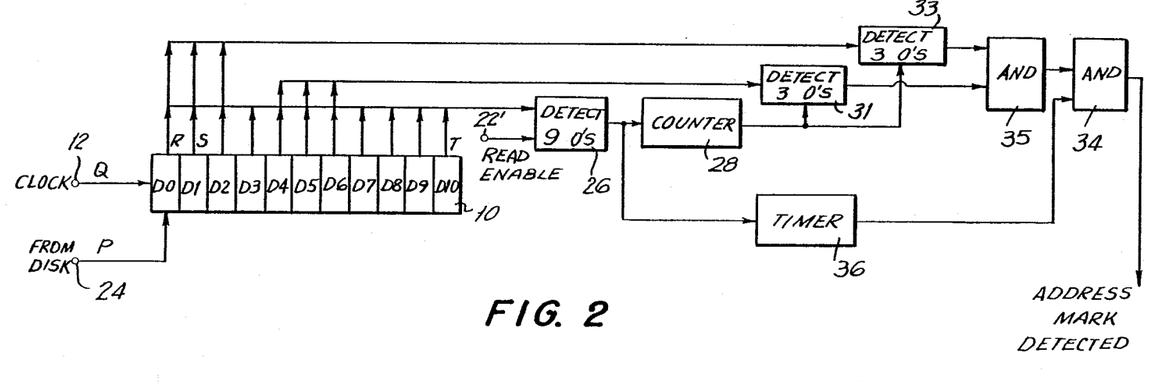
FIG. 2 is a block diagram of a modification of the address mark detector shown in FIG. 1.

An alternative embodiment of the address mark detecting portion of the present invention is illustrated in FIG. 2. In this embodiment, detector 30 and counter 32 are replaced by detectors 31 and 33 and AND gate 35. The remaining circuitry is substantially the same as shown in FIG. 1, as will be readily observed. Detectors 31 and 33 may be similar to detector 30 of FIG. 1 and, for example, each such detector may be comprised of a suitable multiple-input gate. In the illustrated embodiment, detector 31 is coupled at least to stages D4, D5 and D6 and detector 33 is coupled at least to stages D0, D1 and D2. It will be appreciated that detector 31 is adapted to detect three consecutive "0"s stored in stages D4, D5 and D6, respectively; and detector 33 is adapted to detect three consecutive "0"s stored in stages D0, D1 and D2, respectively. Additionally, and to distinguish between the detection of the "0"s which constitute the pulses of relatively narrower duration in the address mark pattern, such as the "0"s which occur between, for example, pulses $P_4$ and $P_5$ and between pulses $P_5$ and $P_6$, from the "0"s which are present in the pulses of longer duration, such as the "0"s which are present between pulses $P_3$ and $P_4$, detectors 31 and 33 also may be connected to additional stages (e. g. stages D7 and D3) to sense the presence of the bit pattern [10001] which, it is appreciated, is representative of the relatively narrower pulse included in the address mark pattern.

In the arrangement shown in FIG. 2, detector 31 may function to detect the address mark pulse which extends from read pulse $P_4$ to read pulse $P_5$ and detector 33 may function to detect the address mark pulse which extends from read pulse $P_5$ to read pulse $P_6$. When these two pulses are present simultaneously, detectors 31 and 33 both produce output sense signals, thereby providing AND gate 35 with a binary "1" at each of its inputs. As a result, a binary "1" is supplied by AND gate 35 to AND gate 34 which, in turn, indicates the detection of an address mark if timer 36 has not yet timed out, as mentioned above.

It will be appreciated that, if desired, detectors 31 and 33 may be connected to other stages of shift register 10, provided those other stages are supplied with two strings of binary "0"s, each string being formed of three such "0"s. Thus, each detector may be connected to the data output terminals of three successive stages of the shift register and, preferably, to a preceding stage and to a following stage to verify the presence therein of the bit pattern [10001] corresponding to a relatively narrow pulse of the address mark pattern. It will be recognized, therefore, that detectors 31 and 33 function to detect the following pattern which, it is appreciated, represents the occurrence of two successive narrower address mark pulses: [100010001]. Other suitable circuitry, such as a 9-input AND gate, various combinations of exclusive OR circuits, and the like may be used to detect the foregoing bit pattern.

Nevertheless, the embodiment shown in FIG. 2 indicates the detection of an address mark if 2-out-of-3 longer pulses and 2-out-of-3 narrower pulses are detected within the predetermined time-out period established by timer 36. As mentioned above, the detection of the longer pulses is achieved by sensing the simultaneous occurrence of nine successive binary "0"s and the detection of the narrower pulses is achieved by sensing the simultaneous occurrence of three successive binary "0"s. The manner in which 2-out-of-3 narrower pulses may be detected has been explained alternatively, as represented by the embodiments of FIGS. 1 and 2.

It will be appreciated that, in the embodiments shown in FIGS. 1 and 2, data which is read from the magnetic disk (or received from a remote location) is supplied to terminal 24 and thence to input stage D0 of shift register 10 in seriatum. That is, during an address mark read operation, as when the disk is searched for an address mark, the digital signals that have been recorded on the disk are played back and serially supplied to shift register 10 in the format shown in FIG. 30 (which represents the pulse transitions that are read from the disk) and FIG. 3P (which represents the read pulses derived from those pulse transitions and supplied to the shift register).

From the preceding description of the generator portion of the illustrated apparatus, it is appreciated that the switching state assumed by change-over switch 16 is controlled by counter 18. When this counter is incremented by a pre-established number (e. g. by the number 4), change-over switch 16 operates to interrupt the feedback path between stages D10 and D0 and to establish the feedback path between stages D3 and D0. This feedback connection may remain until counter 18 subsequently is reset, as in response to the next occurrence of a "start" pulse. Of course, when the counter is incremented by a suitable amount after, for example, three narrower pulses have been generated from the recirculation of a binary "1" through shift register 10, further generation of the address mark pattern is inhibited. It is appreciated, therefore, that counter 18 functions to count the number of relatively longer pulses that have been generated as part of the address mark pattern and also to count the number of relatively narrower pulses that have been generated. In the preferred embodiment, an equal number of longer and narrower pulses are included in the address mark pattern. Hence, as yet a further alternative embodiment, counter 18 may be enabled in response to the first binary "1" supplied thereto from stage D3 during an address mark generating operation, and then the count of this counter may be incremented in response to each following binary "1" supplied thereto. In this alternative embodiment, it will be seen that the counter is incremented by an amount first to change over the state of change-over switch 16 and then by an equal amount to inhibit bistate device 20. As mentioned above, the counter thus may be replaced by a simple counting device whose count is recycled such that, upon obtaining a predetermined count causes a change in state of change-over switch 16, and upon obtaining that count once again serves to inhibit the operation of bistate device 20.

While the present invention has been particularly shown and described with reference to preferred embodiments thereof, it will be readily appreciated by those of ordinary skill in the art that various alternatives, changes and modifications may be made without departing from the spirit and scope of the invention. The particular circuitry which has been described herein should be viewed as being merely illustrative; and other known functional equivalents may be utilized in place thereof. Some of these alternatives and equivalents have been discussed above. Others will be recognized by those of ordinary skill in the art. With respect to the detector portion of the illustrated apparatus, the actual construction and implementation of the various "0" detectors such as detectors 26, 30, 31 and 33, will be known to electrical engineers, circuit designers and engineers having experience in the design and construction of digital equipment. It is intended that such alternatives and equivalents be covered by the appended claims.

What is claimed is:

1. A method of generating an address mark that is distinguishable from informational data, comprising the steps of: (a) generating a data level transition; (b) generating a constant data level free of data level transitions for a first predetermined time duration following said data level transition; (c) repeating steps (a) and (b) a first pre-established number of times; (d) generating another data level transition after steps (a) and (b) have been repeated said first pre-established number of times; (e) generating another constant data level free of data level transitions for a second predetermined time duration following the data level transition of step (d); and (f) repeating steps (d) and (e) a second pre-established number of times.

2. The method of claim 1 wherein said first predetermined time duration is greater than said second predetermined time duration.

3. The method of claim 1 wherein said first pre-established number of times is equal to said second pre-established number of times.

4. The method of claim 1 wherein said first pre-established number of times is greater than said second pre-established number of times.

5. The method of claim 1 wherein said first pre-established number of times is less than said second pre-established number of times.

6. The method of claim 1 wherein each data level transition comprises a binary "1" and each constant data level comprises a binary "0".

7. The method of claim 6 wherein steps (a) and (b) are carried out by shifting a binary "1" through a first predetermined number of stages of a plural stage shift register and generating said data level transition when said binary "1" is shifted to an output stage.

8. The method of claim 7 wherein step (c) is carried out by recirculating said binary "1" through said first predetermined number of stages a first pre-established number of times.

9. The method of claim 8 wherein steps (d) and (e) are carried out by shifting the recirculating binary "1" through a second predetermined number of stages of said shift register.

10. The method of claim 9 wherein step (f) is carried out by recirculating said binary "1" through said second predetermined number of stages a second pre-established number of times.

11. The method of claim 1 further comprising the step of recording said address mark on a data storage disk.

12. A method of sensing an address mark that originates as a first pre-established number of substantially equal first periods of constant data levels followed by a second pre-established number of substantially equal second periods of constant data levels, with adjacent periods being separated by a data level transition, said method comprising the steps of detecting the occurrences of first periods of constant data level; detecting the occurrences of second periods of constant data level only if a first preselected number of first periods of constant data level has been detected; and indicating the occurrence of an address mark if a second preselected number of second periods of constant data level is detected.

13. The method of claim 12 wherein each first period of constant data level is comprised of a first string of binary "0"s; each second period of constant data level is comprised of a second string of binary "0"s; and adjacent strings are separated by a binary "1".

14. The method of claim 13 wherein each first string is longer than each second string.

15. The method of claim 13 wherein each first string is shorter than each second string.

16. The method of claim 13 wherein the first and second strings are of substantially equal length.

17. The method of claim 12 wherein said first preselected number is less than said first pre-established number.

18. The method of claim 17 wherein three substantially equal first periods of constant data levels are included in said address mark; and wherein the sensing of said address mark is dependent upon the detection of two of said first periods.

19. The method of claim 12 wherein said second preselected number is less than said second pre-established number.

20. The method of claim 19 wherein three substantially equal second periods of constant data levels are included in said address mark; and wherein the sensing of said address mark is dependent upon the detection of two of said second periods.

21. The method of claim 12 wherein said address mark is reproduced from a magnetic medium and is loaded into a plural stage shift register during successive bit time intervals.

22. The method of claim 21 wherein a first period of constant data level is detected by gating the contents of a first number of successive stages of said shift register and producing a first output signal if the contents of said stages are substantially equal.

23. The method of claim 22 wherein said first number of successive stages of said shift register is substantially equal to the quotient of said first period divided by said bit time interval.

24. The method of claim 22 wherein a second period of constant data level is detected by gating the contents of a second number of successive stages of said shift register and producing a second output signal if the contents of said second number of successive stages are substantially equal.

25. The method of claim 24 wherein said second number of successive stages differs from said first number of successive stages.

26. The method of claim 25 wherein each produced first output signal is counted, and when said count reaches said first preselected number said second number of successive stages of said shift register are gated; and wherein each produced second output signal is counted, and when said last mentioned count reaches said second preselected number within a determined time duration the occurrence of an address mark is indicated.

27. The method of claim 26 wherein said determined time duration is measured from the time that the first output signal first is produced.

28. The method of claim 27 wherein each first period of constant data level commences with a binary "1" and is followed by a first number of binary "0"s, each second period of constant data level commences with a binary "1" and is followed by a second number of binary "0"s, said shift register has at least said first number of stages, and the binary "1"s and "0"s comprising said address mark are serially supplied to the first stage of said shift register and are shifted to successive stages at successive bit time intervals.

29. Apparatus for generating and detecting an address mark, comprising: a plural stage shift register; a source of shift pulses coupled to said shift register; means for supplying a signal to a first stage of said shift register to be shifted therethrough to an output thereof; means for recirculating said signal through a first predetermined number of stages of said shift register a first pre-established number of times and then recirculating a signal through a second predetermined number of stages of said shift register a second pre-established number of times, whereby said address mark is generated from said output of said shift register; means for supplying a signal which may be an address mark to be detected to said first stage of said shift register; first gate means coupled to a first number of successive stages of said shift register for sensing substantially equal contents of said first number of stages and for producing a first sense signal; second gate means coupled to a second number of successive stages of said shift register for sensing substantially equal contents of said second number of stages and for producing a second sense signal; and means for detecting when n first sense signals are produced and when m second sense signals are produced (wherein n is less than or equal to said first pre-established number and m is less than or equal to said second pre-established number) to indicate the occurrence of said address mark.

30. The apparatus of claim 29 wherein said first pre-established number is equal to said second pre-established number.

31. The apparatus of claim 30 wherein said means for recirculating said signal through said shift register includes counter means coupled to said output and incremented in response to each circulation of a signal through said first predetermined number of stages, a signal being circulated through said second predetermined number of stages of said shift register when the count of said counter means has been incremented by said pre-established number.

32. The apparatus of claim 31 wherein said counter means additionally is incremented in response to each circulation of a signal through said second predetermined number of stages of said shift register; and further including means for disabling further generation of an address mark when the count of said counter means has been incremented again by said pre-established number.

33. The apparatus of claim 32 wherein said first predetermined number of stages is greater than said second predetermined number of stages.

34. The apparatus of claim 33 wherein each of the signals supplied for circulation through the respective first and second predetermined number of stages of said shift register is a binary "1".

35. The apparatus of claim 34, further comprising bistate means coupled to the output of said shift register for changing the state assumed thereby in response to the shifting of a binary "1" to said output.

36. The apparatus of claim 29 further comprising timing means triggered to define a predetermined time-out period when said first sense signal is first produced and for inhibiting the indication of the occurrence of said address mark if n first sense signals and m second sense signals are not detected before the end of said time-out period.

37. The apparatus of claim 29 wherein said first number of stages to which said first gate means is coupled is greater than said second number of stages to which said second gate means is coupled.

38. The apparatus of claim 29 wherein said address mark is comprised of a first predetermined number of strings of bits of a first sense, adjacent strings being separated by a bit of opposite sense; followed by a second predetermined number of strings of bits of said first sense, with adjacent strings being separated by a bit of said opposite sense.

39. The apparatus of claim 38 wherein each string in said first predetermined number of strings is longer than each string in said second predetermined number of strings.

40. The apparatus of claim 39 wherein said first predetermined number of strings is equal to said first pre-established number of times that a signal is recirculated through said shift register during address mark generation, and said second predetermined number of strings is equal to said second pre-established number of times that a signal is recirculated through said shift register during address mark generation.

41. The apparatus of claim 40 wherein said first predetermined number is equal to said second predetermined number.

42. The apparatus of claim 39 wherein each string in said first predetermined number of strings is comprised of a successive binary "0"s and each string in said second predetermined number of strings is comprised of b successive binary "0"s.

43. The apparatus of claim 42 wherein said first gate means is coupled to a successive stages of said shift register to sense the presence of a concurrent binary "0"s therein; and said second gate means is coupled to b successive stages of said shift register to sense the presence of b concurrent binary "0"s therein.

44. The apparatus of claim 43 wherein said means for detecting comprises first counting means coupled to said first gate means for counting the first sense signals produced thereby and for enabling said second gate means when n first sense signals have been counted; and second counting means coupled to said second gate means for counting the second sense signals produced thereby and for indicating the occurrence of an address mark when m second sense signals have been counted.

45. Apparatus for recording an address mark on a magnetic medium on which informational data also is recorded, comprising: pattern generating means for generating a first recurrent pattern of bits that is distinct from any informational data pattern in the form of x successive substantially rectangular pulses of substantially equal length and for generating a second recurrent pattern following said first pattern in the form of y successive substantially rectangular pulses of substantially equal length, including a shift register; a source of shift pulses for shifting bits through said shift register; means for recirculating a bit through a first predetermined number of stages of said shift register; and means for recirculating a bit through a second predetermined number of stages of said shift register; whereby said x pulses are generated when said bit is recirculated through said first predetermined number of stages and said y pulses are generated when said bit is recirculataed through said second predetermined number of stages; and recording means coupled to said pattern generating means for recording said x pulses followed by said y pulses.

46. The apparatus of claim 45 wherein said pattern generating means further comprises bistate means coupled to an output stage of said shift register and triggered from one state to another in response to said bit.

47. The apparatus of claim 46 wherein said bit is a binary "1".

48. The apparatus of claim 45 wherein said means for recirculating comprises counter means coupled to said output stage of said shift register for generating a count representing the number of times said bit is shifted to said output stage; means for feeding said bit through said first predetermined number of stages when said count is less than a predetermined amount; and means for feeding said bit through said second predetermined number of stages after said count reaches said predetermined amount.

49. The apparatus of claim 48 wherein said predetermined amount is substantially equal to x.

50. The apparatus of claim 48 further comprising means for inhibiting said pattern generating means after said y pulses have been recorded.

51. The apparatus of claim 48 further comprising means for supplying a start bit to said shift register for initiating the generation of said recurrent patterns of bits.

52. Apparatus for detecting an address mark on a record medium on which informational data is recorded, the address mark being recorded as x successive substantially rectangular pulses of substantially equal length followed by y successive substantially rectangular pulses of substantially equal length, said apparatus comprising reproducing means for reproducing said address mark from said record medium; first sensing means for sensing n-out-of-x substantially rectangular pulses in the reproduced address mark; second sensing means for sensing m-out-of-y substantially rectangular pulses in the reproduced address mark; and indicating means for indicating the presence of an address mark if n-out-of-x and m-out-of-y pulses have been sensed.

53. The apparatus of claim 52 wherein said indicating means includes timing means triggered when the first of said x substantially rectangular pulses is sensed for defining a predetermined time duration; and means for indicating the presence of an address mark if said n-out-of-x and m-out-of-y pulses have been sensed within said predetermined time duration.

54. The apparatus of claim 52 wherein said reproducing means reproduces said address mark in the form of a bit of one sense at the beginning of each of the x and y pulses and successive bits of opposite sense for the remainder of each pulse.

55. The apparatus of claim 54 further comprising a plural stage shift register; means for serially supplying the bits comprising said address mark to said shift register; and a source of shift pulses coupled to said shift register for shifting said bits therethrough.

56. The apparatus of claim 55 wherein said first sensing means comprises first gate means coupled to a first pre-established number of stages of said shift register for producing a first sense signal when bits of said opposite sense are stored concurrently in said pre-established number of stages; and first counting means for counting the produced first sense signals.

57. The apparatus of claim 56 wherein said second sensing means comprises second gate means coupled to a second pre-established number of stages of said shift register and enabled when said first counting means counts n first sense signals for producing a second sense signal when bits of said opposite sense are stored concurrently in said second pre-established number of stages; and second counting means for counting the produced second sense signals to provide a detection signal when m second sense signals are counted.

58. The apparatus of claim 57 wherein said first pre-established number is greater than said second pre-established number.

59. The apparatus of claim 58 wherein n=m.

60. The apparatus of claim 58 wherein a bit of said one sense is a binary "1" and a bit of said opposite sense is a binary "0".

* * * * *